United States Patent
Yu

(10) Patent No.: US 11,934,653 B2
(45) Date of Patent: Mar. 19, 2024

(54) SPLIT SCREEN PROCESSING METHOD AND ELECTRONIC DEVICE

(71) Applicant: Lenovo (Beijing) Limited, Beijing (CN)

(72) Inventor: Long Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/310,849

(22) Filed: May 2, 2023

(65) Prior Publication Data

US 2023/0367474 A1    Nov. 16, 2023

(30) Foreign Application Priority Data

May 12, 2022   (CN) .......................... 202210514041.7

(51) Int. Cl.
*G06F 3/04886*    (2022.01)
*G06F 3/04883*    (2022.01)

(52) U.S. Cl.
CPC ...... *G06F 3/04886* (2013.01); *G06F 3/04883* (2013.01); *G06F 2203/04803* (2013.01)

(58) Field of Classification Search
CPC .................................................. G06F 3/04886
USPC ....................................................... 715/792
See application file for complete search history.

(56) References Cited

U.S. PATENT DOCUMENTS

| | | | | |
|---|---|---|---|---|
| 6,008,809 A | * | 12/1999 | Brooks | G06F 3/0481 715/792 |
| 6,874,128 B1 | * | 3/2005 | Moore | G06F 3/0486 715/788 |
| 7,890,882 B1 | * | 2/2011 | Nelson | G06F 9/451 715/788 |
| 8,525,808 B1 | * | 9/2013 | Buening | G06F 3/04886 345/173 |
| 8,547,347 B2 | * | 10/2013 | Chiang | G06F 3/0488 715/857 |
| 10,667,790 B2 | * | 6/2020 | Chiang | A61B 8/4477 |
| 11,086,510 B2 | * | 8/2021 | Shi | G06F 1/3265 |
| 11,797,145 B2 | * | 10/2023 | Zhao | G06F 3/04883 |
| 2006/0020903 A1 | * | 1/2006 | Wang | G06F 3/0481 715/792 |
| 2010/0079392 A1 | * | 4/2010 | Chiang | G06F 3/04886 715/788 |

(Continued)

OTHER PUBLICATIONS

Tim Harris Video AI, working screenshot of the video on "How to do iPhone Split Screen | Multitask with Two Apps on at Once ", available at [https://www.youtube.com/watch?v=XkiWMRJP_ws], published on Aug. 30, 2021 (Year: 2021).*

(Continued)

*Primary Examiner* — Reza Nabi
(74) *Attorney, Agent, or Firm* — ANOVA LAW GROUP, PLLC

(57) ABSTRACT

A split screen processing method includes determining that a screen is in a first interface state, the first interface state including a plurality of snapshot windows, obtaining a first gesture operation for at least two snapshot windows of the plurality of snapshot windows, and determining that the first gesture operation satisfying a split screen gesture condition, and controlling the at least two snapshot windows to be displayed on the screen in a split screen mode.

16 Claims, 10 Drawing Sheets

(56) References Cited

U.S. PATENT DOCUMENTS

| | | | | |
|---|---|---|---|---|
| 2016/0062639 A1* | 3/2016 | Hwang | ............... | G06F 3/04817 |
| | | | | 715/790 |
| 2016/0228091 A1* | 8/2016 | Chiang | ................. | A61B 8/462 |
| 2018/0081517 A1* | 3/2018 | Luo | ....................... | G06F 3/0488 |
| 2020/0333932 A1* | 10/2020 | Lee | ..................... | G06F 3/04817 |
| 2023/0019876 A1* | 1/2023 | Yoon | .................... | G06F 1/1643 |
| 2023/0059017 A1* | 2/2023 | Yi | ......................... | G06F 3/0482 |
| 2023/0082360 A1* | 3/2023 | Shen | ................... | G06F 3/04886 |
| | | | | 715/764 |
| 2023/0289057 A1* | 9/2023 | Suzaki | ............... | G06F 3/04886 |
| | | | | 715/792 |

OTHER PUBLICATIONS

9To5google, working screenshot of the video on "How to enable split screen multitasking in android 13!", available at [https://www.youtube.com/watch?v=hnOCTZdDflE], published on Jan. 13, 2023 (Year: 2023).*

* cited by examiner

SPLIT SCREEN PROCESSING METHOD AND ELECTRONIC DEVICE

CROSS-REFERENCE TO RELATED APPLICATION

This application claims priority to Chinese Patent Application No. 202210514041.7, filed on May 12, 2022, the entire content of which is incorporated herein by reference.

TECHNICAL FIELD

The present disclosure relates to the information processing field and, more particularly, to a split screen processing method and an electronic device.

BACKGROUND

When split screen processing needs to be performed on an electronic device, an operation interface of a split screen operation needs to be called first. Then, different programs that need to be displayed on a divided screen are selected. The whole process includes many operation processes.

SUMMARY

Embodiments of the present disclosure provide a split screen processing method. The method includes determining that a screen is in a first interface state, the first interface state including a plurality of snapshot windows, obtaining a first gesture operation for at least two snapshot windows of the plurality of snapshot windows, and determining that the first gesture operation satisfying a split screen gesture condition, and controlling the at least two snapshot windows to be displayed on the screen in a split screen mode.

Embodiments of the present disclosure provide an electronic device, including a screen and one or more processors. The one or more processors are configured to determine that a screen is in a first interface state, the first interface state including a plurality of snapshot windows, obtain a first gesture operation for at least two snapshot windows of the plurality of snapshot windows, and determine that the first gesture operation satisfying a split screen gesture condition, and control the at least two snapshot windows to be displayed on the screen in a split screen mode.

DETAILED DESCRIPTION OF THE EMBODIMENTS

The technical solutions of embodiments of the present disclosure are described in detail below with reference to the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

Figure 1:
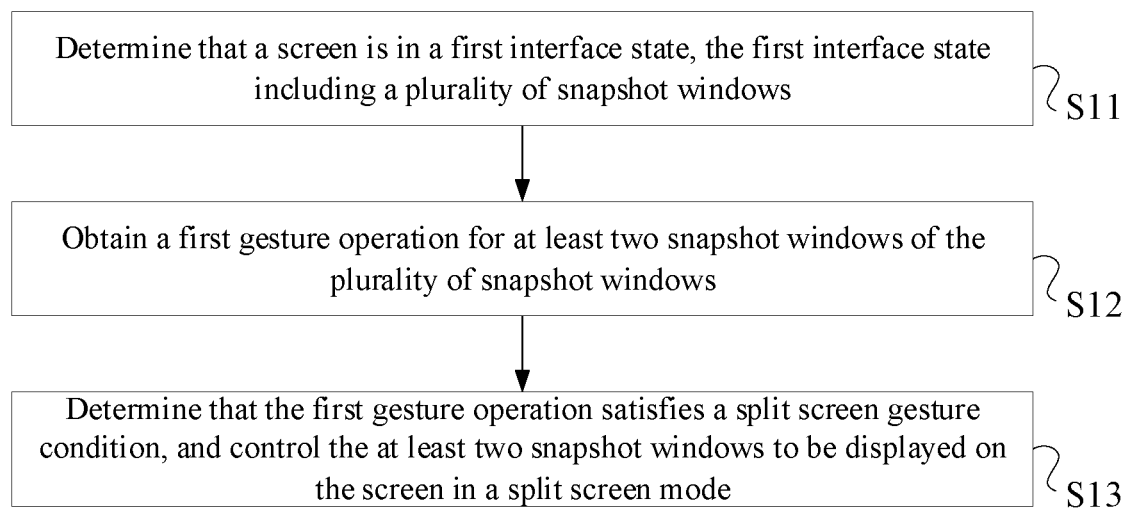
FIG. 1 illustrates a schematic flowchart of a split screen processing method according to some embodiments of the present disclosure.

As shown in FIG. 1, the present disclosure provides a split screen processing method. The method includes the following processes.

At S11, a screen is determined to be in a first interface state, and the first interface state includes a plurality of snapshot windows.

At S12, a first gesture operation is obtained for at least two snapshot windows of the plurality of snapshot windows.

At S13, the first gesture operation is determined to satisfy a split screen gesture condition, and the at least two snapshot windows are controlled to be displayed on the screen in a split screen mode.

In some embodiments, a snapshot window that is to be split screen displayed can be determined based on the first gesture operation satisfying the split screen gesture condition. Then, the snapshot window that is to be split screen displayed can be displayed on the screen in a split screen mode. Thus, a selection operation may not need to be performed on the snapshot windows that are to be split screen displayed to realize the split screen. Therefore, the operation can be simple.

Figure 2:
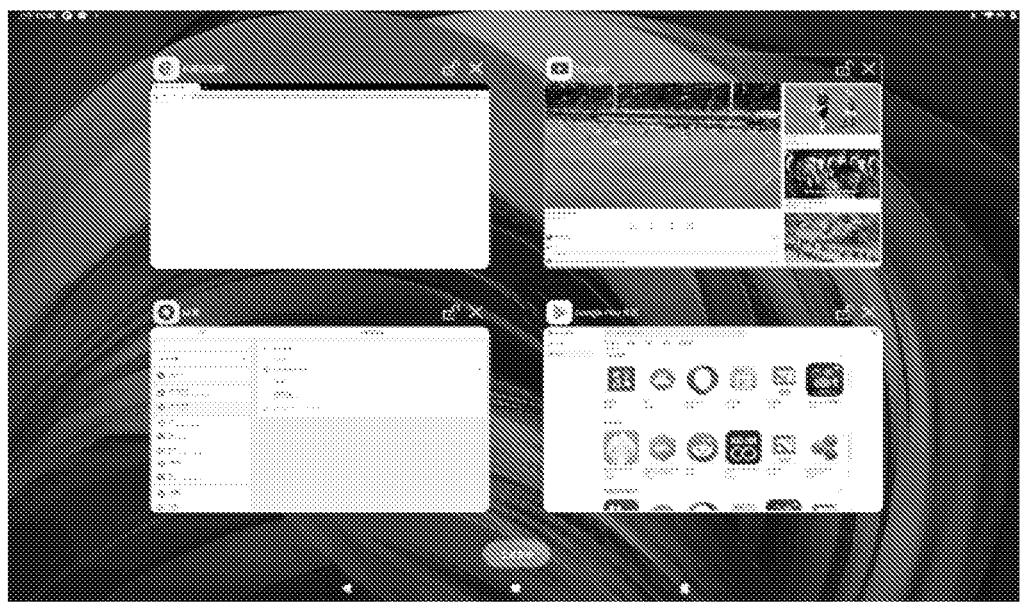
FIG. 2 illustrates a schematic diagram of a first interface state according to some embodiments of the present disclosure.

In some embodiments, the interface display status of the screen of the electronic device can be monitored in real-time or once at a predetermined time length. If the interface display status of the screen of the electronic device is a first interface state, a display interface of the screen displays the plurality of snapshot windows as shown in FIG. 2.

In some embodiments, monitoring the interface display status of the screen of the electronic device can be determined by monitoring the triggering of a predetermined operation key, for example, monitoring a physical key or a virtual operation key corresponding to entering the display status.

Determining that the screen is in the first interface state can include determining at least one application that is in a running status on the electronic device and with a running time satisfying a predetermined time condition, the at least one application being displayed on the screen in a snapshot window mode, and then determining that the screen is in the first interface state.

When the screen is in the first interface state, the display interface of the screen can display the snapshot window of the at least one application. Only the application in the running status and with the running time satisfying the predetermined time condition can be in a first display status to be displayed in the snapshot window mode. Thus, in the first interface state, the screen can display the snapshot window of the at least one application that is in the running status and with the running time satisfying the predetermined time condition.

When the screen is in the first interface state, the first gesture operation for at least two snapshot windows of the plurality of snapshot windows can be obtained. Whether the first gesture operation satisfies a split screen gesture condition may further need to be determined.

The split screen gesture condition can be predetermined. Only when the first gesture operation satisfies the split screen gesture condition, a split screen display can be directly performed based on the first gesture operation. If the first gesture operation does not satisfy the split screen gesture condition, whether the first gesture operation satisfies another gesture condition can be determined, and a corresponding operation can be performed based on the first gesture operation satisfying the gesture condition. In some embodiments, if the first gesture operation does not satisfy any one gesture condition, the first gesture operation can be determined to be a maloperation, which cannot be responded to.

A plurality of split screen gesture conditions can be included. When the first gesture operation satisfies different split screen gesture conditions, different split screen displays can be performed.

For example, if the first gesture operation satisfies the first split screen gesture condition, two snapshot windows can be controlled to perform a two-division-screen operation based on that the first gesture operation satisfies the first split screen gesture condition. If the first gesture operation satisfies the second split screen gesture condition, three snapshot windows can be controlled to perform a three-sub-split screen operation based on that the first gesture operation satisfies the second split screen gesture condition.

The at least two snapshot windows performing the split screen display can be determined based on the first gesture operation. The first gesture operation can be obtained. The first gesture operation can be performed based on at least two snapshot windows of the plurality of snapshot windows. For example, if the first gesture operation is close to the at least two snapshot windows, the split screen display can be performed on the at least two snapshot windows when the first gesture operation satisfies the split screen gesture condition. In some other embodiments, if the first gesture operation overlaps or contacts the at least two snapshot windows, the split screen display can be performed on the at least two snapshot windows when the first gesture operation satisfies the split screen gesture condition.

In some embodiments, a first operation trajectory of the first gesture operation is determined. If the first operation trajectory is determined to correspond to at least two snapshot windows, the at least two snapshot windows can be controlled to be displayed on the screen in a split screen mode.

The first gesture operation can correspond to a first operation trajectory. At least two snapshot windows can be determined based on the first operation trajectory. The at least two snapshot windows corresponding to the first operation trajectory can include the following snapshot windows. If the first gesture operation is a gesture operation contacting the screen, the first operation trajectory can be an operation trajectory on the screen. Thus, the at least two snapshot windows corresponding to the first operation trajectory can be snapshot windows of the screen through which the first operation trajectory passes or neighboring to the first operation trajectory. If the first gesture operation is a gesture operation that is not in direct contact with the screen, the first operation trajectory can be an operation trajectory that is not in contact with the screen. Thus, the at least two snapshot windows corresponding to the first operation trajectory can be snapshot windows through which a projection of the first operation trajectory on the screen passes or neighboring to the projection of the first operation trajectory on the screen.

When the at least two snapshot windows are controlled to be displayed on the screen in the split screen mode, other windows except for the at least two snapshot windows in the first interface state cannot be displayed on the screen. The screen can only display the at least two snapshot windows displayed in the split screen mode. However, applications corresponding to the other snapshot windows besides the at least two snapshot windows of the plurality of snapshot windows can be still in the running status until a closing operation is performed on a snapshot window or an exiting operation is directly performed on an application corresponding to the snapshot window. Then, the corresponding snapshot window can be controlled to exit and can be no longer in the running status.

In addition, in some embodiments, if the interface display status of the screen of the electronic device is determined to be not the first interface state, the current display interface can include a display interface when the screen is normal, such as a main interface of the electronic device, a display interface of a secondary screen, or a display interface of an application. No matter to which one of the display interfaces above the current display interface belongs, the screen does not display the plurality of snapshot windows. Thus, a gesture operation for the snapshot window cannot be obtained. That is, even if a gesture operation is obtained, the gesture operation cannot be a gesture operation for the snapshot window. Thus, the split screen display cannot be performed.

In some other embodiments, after the first gesture operation is obtained, the interface state of the screen of the electronic device can be obtained. If the screen is determined to be in the first interface state, whether the first gesture operation is a gesture operation for at least two snapshot windows in the first interface state can be determined. If the first gesture operation is the gesture operation for the at least two snapshot windows of the plurality of snapshot windows, the at least two snapshot windows can be controlled to be displayed on the screen in the split screen mode when the first gesture operation is further determined to satisfy the split screen gesture condition.

The split screen processing method of embodiments of the present disclosure can include determining that the screen is in the first interface state. The first interface state includes the plurality of snapshot windows. The method can further include obtaining the first gesture operation for the at least two snapshot windows of the plurality of snapshot windows, determining that the first gesture operation satisfying the split screen gesture condition, and controlling the at least two snapshot windows to be displayed on the screen in the split screen mode. In the technical solution, when the split screen display is performed on the snapshot windows in the screen, the split screen display can be directly implemented based on the first gesture operation satisfying the split screen gesture condition. Operations do not need to be performed on a plurality of snapshot windows that require the split screen display, respectively. Thus, the operation processes can be reduced, and the split screen efficiency can be increased.

Figure 3:
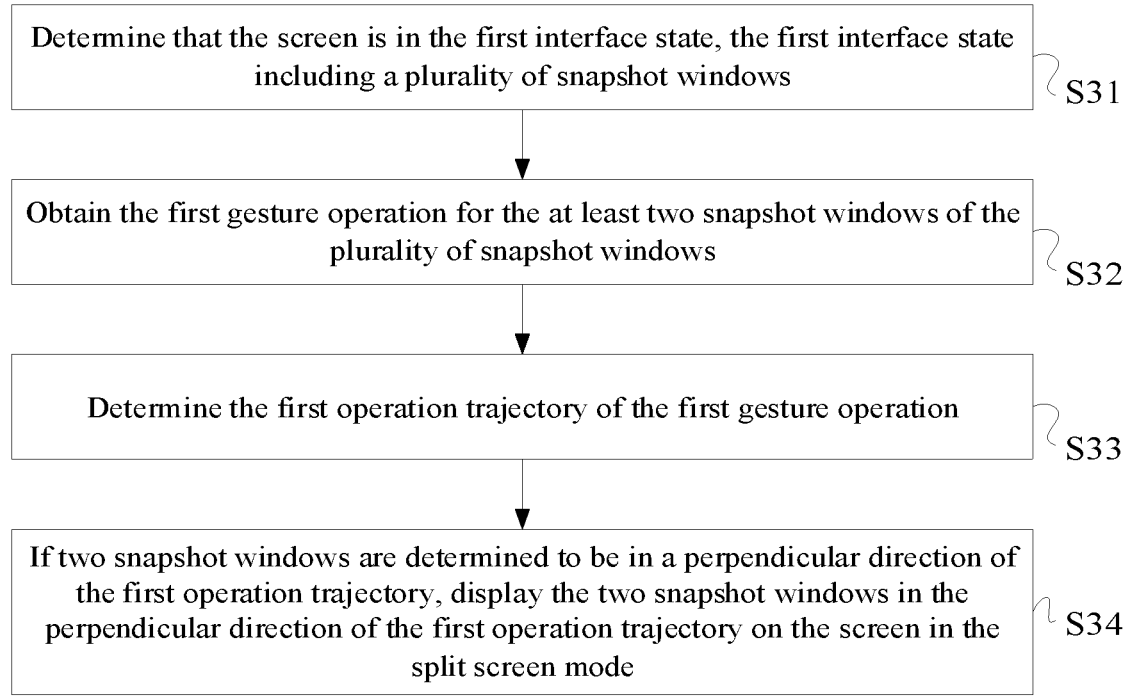
FIG. 3 illustrates a schematic flowchart of a split screen processing method according to some embodiments of the present disclosure.

Embodiments of the present disclosure provide a split screen processing method. As shown in FIG. 3, a flowchart of the method includes the following processes.

At S31, the screen is determined to be in the first interface state. The first interface state includes the plurality of snapshot windows.

At S32, the first gesture operation for the at least two snapshot windows of the plurality of snapshot windows is obtained.

At S33, the first operation trajectory of the first gesture operation is determined.

At S34, if two snapshot windows are determined to be in a perpendicular direction to the first operation trajectory, the two snapshot windows in the perpendicular direction of the first operation trajectory are displayed on the screen in the split screen mode.

When the display screen is in the first interface state, the first gesture operation can be obtained, and the first operation trajectory of the first gesture operation can be determined. When the display screen is in the first interface state, a plurality of snapshot windows can be displayed on the screen. Then, when the first operation trajectory exists, the direction of the first operation trajectory can be determined. The screen can be a touch screen. The first operation trajectory can be an operation trajectory for the touch screen.

The direction of the first operation trajectory can be a horizontal direction, a vertical direction, or an oblique direction.

Figure 4:
FIG. 4 illustrates a schematic diagram showing a first operation trajectory and a plurality of snapshot windows according to some embodiments of the present disclosure.
Figure 5:
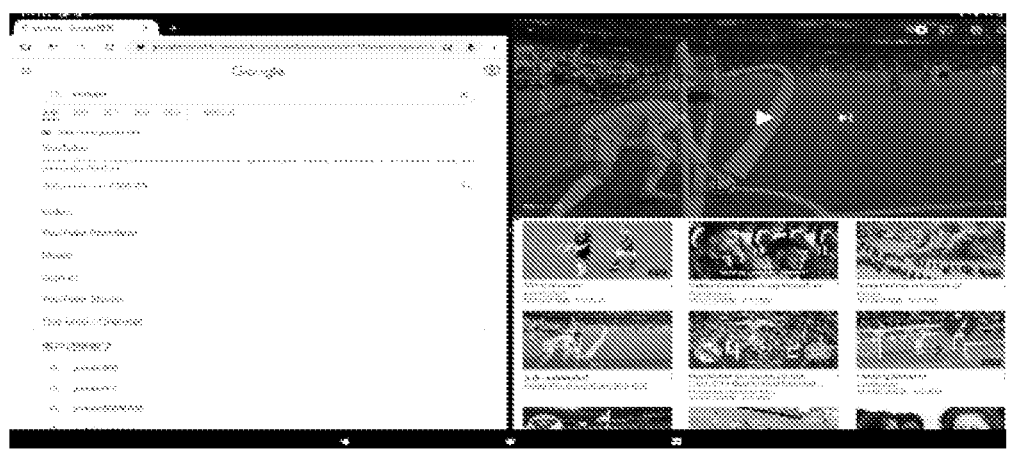
FIG. 5 illustrates a schematic diagram showing a display of two snapshot windows in a divided screen based on a first gesture operation according to some embodiments of the present disclosure.

No matter which direction the first operation trajectory has, a corresponding perpendicular direction may exist. As shown in FIG. 4, if the first operation trajectory is denoted by 41, a perpendicular direction of the first operation trajectory is a connection line of two snapshot windows on the left and right sides of the first operation trajectory 41. Then, the two snapshot windows in the perpendicular direction of the first operation trajectory can be the two snapshot windows on the left and right sides of the first operation trajectory 41. Thus, the two snapshot windows on the left and right sides of the first operation trajectory 41 can be directly controlled to be displayed on the screen in the split screen manner. The split screen effect is shown in FIG. 5. Since the snapshot windows on the left and right sides of the first operation trajectory 41 are authority controllers Chrome and YouTube, respectively, Chrome and YouTube can be displayed on the screen in the split screen mode based on the first gesture operation of the first operation trajectory 41.

Figure 6:
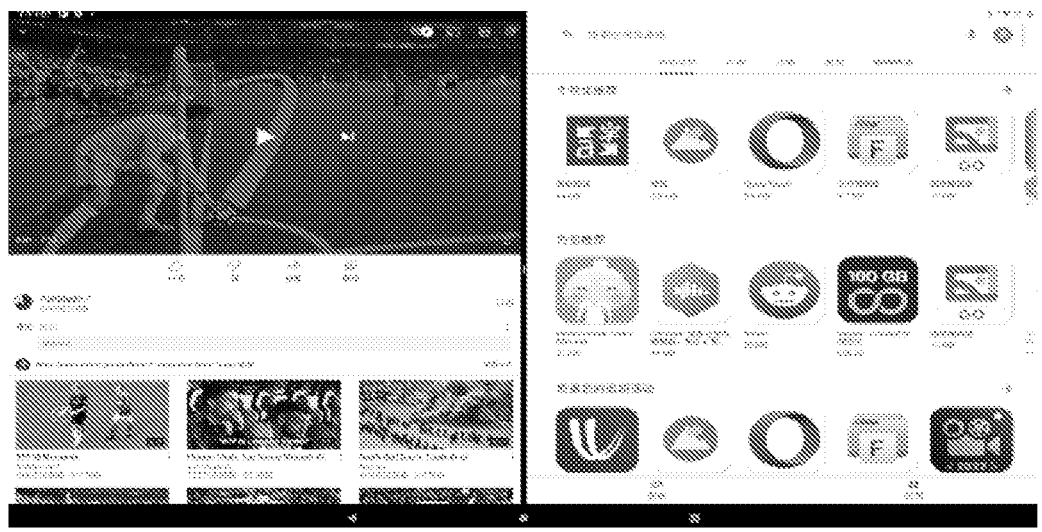
FIG. 6 illustrates a schematic diagram showing a display of two snapshot windows in a divided screen based on a first gesture operation according to some embodiments of the present disclosure.

If the first operation trajectory is a trajectory 42 in FIG. 4, the perpendicular direction of the first operation trajectory can be a connection line between two snapshot windows on the upper and lower sides of the first operation trajectory 42. The two snapshot windows in the perpendicular direction of the first operation trajectory can be the two snapshot windows on the upper and lower sides of the first operation trajectory 42. Thus, the two snapshot windows on the upper and lower sides of the first operation trajectory 42 can be directly controlled to be displayed on the screen in the split screen mode as shown in FIG. 6. Since the two snapshot windows on the upper and lower sides of the first operation trajectory 42 are YouTube and Play Store, respectively, YouTube and Play Store can be displayed on the screen in the split screen mode based on the first gesture operation of the first operation trajectory 42.

No matter whether the direction of the first operation trajectory is the horizontal direction or the perpendicular direction, the snapshot window in the perpendicular direction may further need to be determined based on the coverage range of the first operation trajectory. As shown in FIG. 4, a coverage range of a first operation trajectory 41 is the two snapshot windows of the authority controllers Chrome and YouTube in the perpendicular direction, Chrome and YouTube are controlled to be displayed on the screen in the split screen mode based on the first operation trajectory 41.

Figure 7:
FIG. 7 illustrates a schematic diagram showing a first operation trajectory and snapshot windows according to some embodiments of the present disclosure.

As shown in FIG. 7, a coverage range of a first operation trajectory 71 includes the two snapshot windows of the authority controllers Chrome and YouTube in the perpendicular direction and two snapshot windows of the settings and Play store in the perpendicular direction. However, a range of the first operation trajectory 71 covering the two snapshot windows of the authority controllers Chrome and YouTube is obviously larger than a range of the first operation trajectory 71 covering the two snapshot windows of the settings and Play Store. Thus, Chrome and YouTube are controlled to be displayed on the screen in the split screen mode based on the first operation trajectory 71.

Further, the snapshot windows displayed on the screen in the split screen mode can be determined as follows.

If the first operation trajectory is determined to be parallel to the boundaries of the two snapshot windows, and distances between the first operation trajectory and the boundaries of the two snapshot windows are respectively smaller than a first predetermined distance, the two snapshot windows can be controlled to be displayed on the screen in the split screen mode.

That is, the snapshot windows corresponding to the first operation trajectory can also be determined through the distances between the first operation trajectory and the boundaries of the snapshot windows. Each snapshot window can include four boundaries, and no matter which boundary of the snapshot window is close to the first operation trajectory, as long as the first operation trajectory is parallel to a certain boundary of the snapshot window and the distance between the first operation trajectory and the boundary is smaller than the first predetermined distance, the application corresponding to the snapshot window can be controlled to be used as one of the applications displayed on the screen in the split screen mode.

When the first operation trajectory is located between two snapshot windows, as long as a distance between the first operation trajectory and a certain boundary of each of the two snapshot windows is smaller than the first predetermined distance, and the boundary is parallel to the first operation trajectory, display interfaces of applications corresponding to the two snapshot windows can be controlled to be displayed on the screen in the split screen mode. That is, the screen can be divided into two screens.

The distance between the first operation trajectory and the boundary of the snapshot window being smaller than the first predetermined distance can mean that a perpendicular distance between the first operation trajectory and the boundary of the snapshot window is smaller than the first predetermined distance.

The split screen processing method of embodiments of the present disclosure can include determining that the screen is in the first interface state. The first interface state can include the plurality of snapshot windows. The method can further include obtaining the first gesture operation for the at least two snapshot windows of the plurality of snapshot windows, determining the first operation trajectory of the first gesture operation, and controlling the two snapshot windows in the perpendicular direction of the first operation trajectory to be displayed on the screen in the split screen mode if the two snapshot windows are determined in the perpendicular direction of the first operation trajectory. In some embodiments, when the snapshot windows are displayed on the screen in the split screen mode, the two snapshot windows in the perpendicular direction of the first operation trajectory can be directly displayed on the screen in the split screen mode based on the first gesture operation. Operations may not need to be performed on the plurality of snapshot windows that need to be displayed on the screen in the split screen mode, respectively. Thus, the operation processes can be reduced, and the split screen efficiency can be improved.

Figure 8:
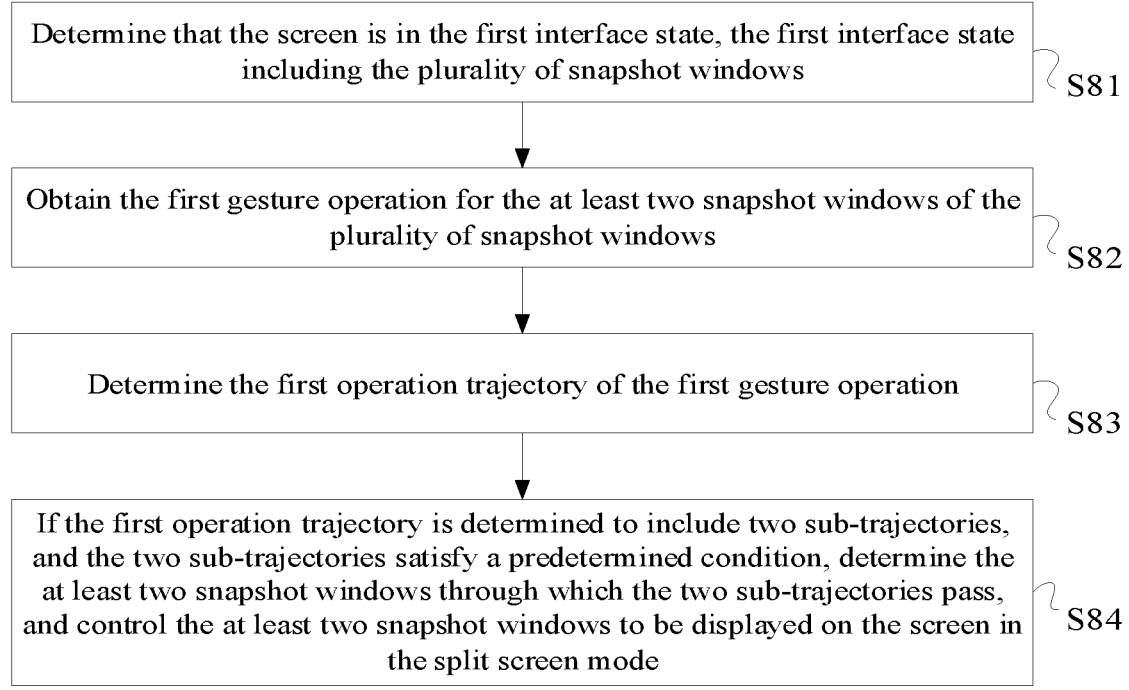
FIG. 8 illustrates a schematic flowchart of a split screen processing method according to some embodiments of the present disclosure.

As shown in FIG. 8, the split screen processing method of embodiments of the present disclosure includes the following processes.

At S81, the screen is determined to be in the first interface state. The first interface state includes the plurality of snapshot windows.

At S82, the first gesture operation for the at least two snapshot windows of the plurality of snapshot windows is obtained.

At S83, the first operation trajectory of the first gesture operation is determined.

At S84, if the first operation trajectory is determined to include two sub-trajectories, and the two sub-trajectories satisfy a predetermined condition, the at least two snapshot windows through which the two sub-trajectories pass are determined, and the at least two snapshot windows are controlled to be displayed on the screen in the split screen mode.

When the screen is in the first interface state, the first gesture operation can be obtained. If the first operation trajectory of the first gesture operation includes the two sub-trajectories satisfying the predetermined condition, and the two sub-trajectories pass through the at least two snapshot windows, the at least two snapshot windows through which the two sub-trajectories pass can be controlled to be displayed on the screen in the split screen mode.

The first operation trajectory can satisfy the predetermined condition. The first operation trajectory can include a motion trajectory of two touch points on the touch screen. The preset condition can include that a straight-line distance between the two touch points reduces. Thus, for example, two fingers can perform a pinch operation on the screen.

Figure 9:
FIG. 9 illustrates a schematic diagram showing two trajectories on a straight line according to some embodiments of the present disclosure.
Figure 10:
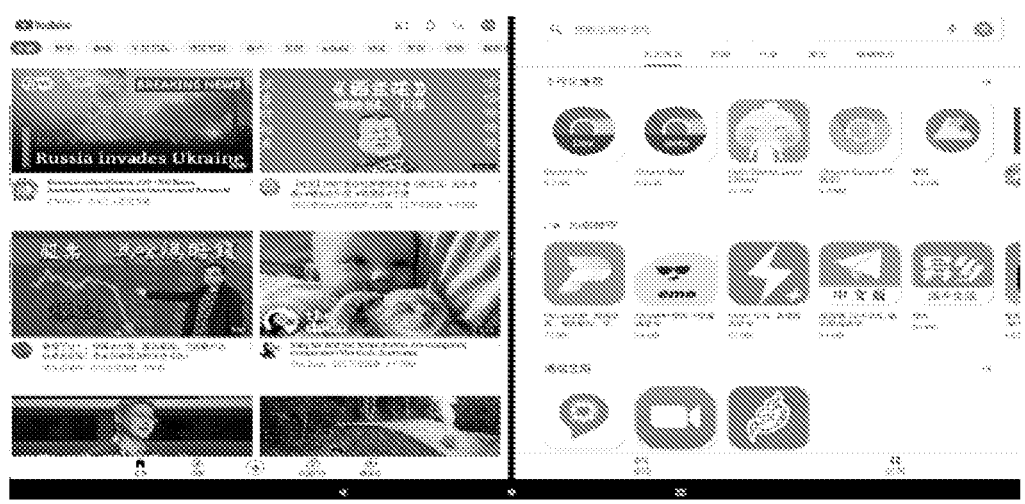
FIG. 10 illustrates a schematic diagram showing a display of two snapshot windows in a divided screen based on two trajectories according to some embodiments of the present disclosure.
Figure 11:
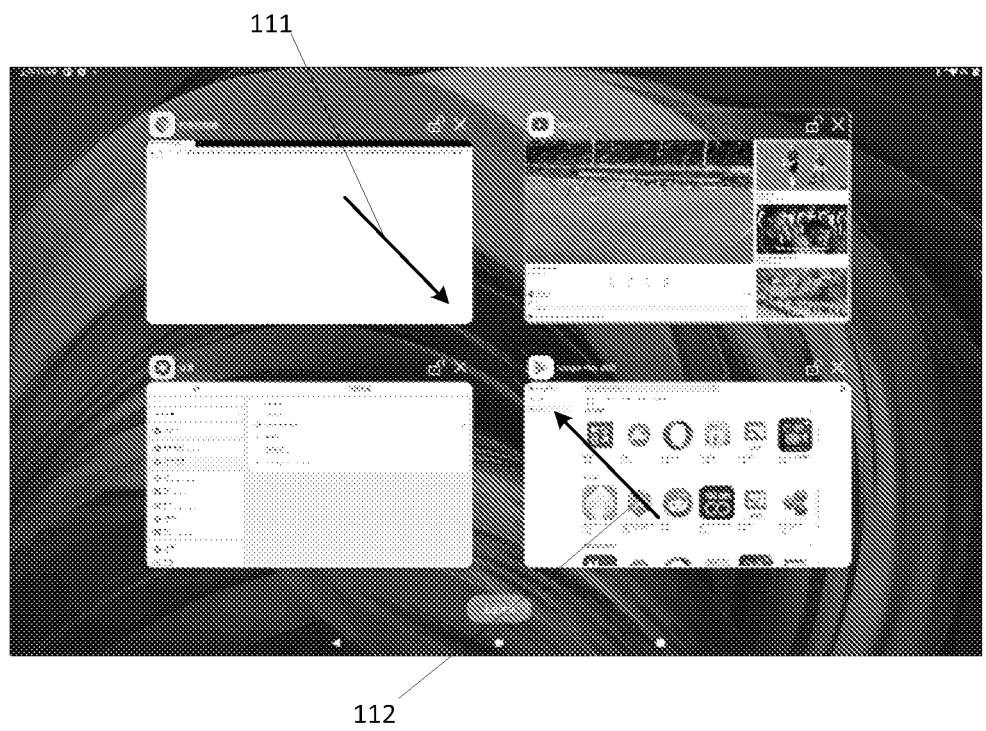
FIG. 11 illustrates a schematic diagram showing two trajectories on a straight line according to some embodiments of the present disclosure.

As shown in FIG. 9 or FIG. 11, two sub-trajectories are included. In FIG. 9, a first sub-trajectory 91 is generated by a motion of a first touch point, and a second sub-trajectory 92 is generated by a motion of a second touch point. Before the motion starts, the straight-line distance between a position of the first touch point and a position of the second touch point can be the farthest. As the first touch point and the second touch point move, the straight-line distance between the two points decreases, and the first sub-trajectory and the second sub-trajectory are formed. The first sub-trajectory 91 and the second sub-trajectory 92 belong to the same first operation trajectory. The first gesture operation corresponding to the first operation trajectory including the first sub-trajectory 91 and the second sub-trajectory 92 can be directly determined as the operation satisfying the split screen gesture condition. Thus, as shown in FIG. 10, YouTube through which the first sub-trajectory 91 passes and Play Store through which the second sub-trajectory 92 passes are directly displayed on the screen in the split screen mode based on the first sub-trajectory 91 and the second sub-trajectory 92.

In addition, the first operation trajectory can be determined to include the two sub-trajectories. That is, the first operation trajectory can be formed by the motions of the two touch points. A trajectory direction of the first sub-trajectory 91 and a trajectory direction of the second sub-trajectory 92 may not need to be considered. That is, whether the straight-line distance between the first touch point and the second touch point decreases or increases may not need to be considered as the touch points move. The first gesture operation corresponding to the first operation trajectory including the first sub-trajectory 91 and the second sub-trajectory 92 can be directly determined to satisfy the split screen gesture condition. As the touch points move, when the straight-line distance between the first touch point and the second touch point decreases, the two fingers can pinch on the touch screen. As the touch points move, when the straight-line distance between the first touch point and the second touch point increases, the two fingers can be away from each other on the screen.

In some other embodiments, the first operation trajectory can be determined to include two sub-trajectories. That is, the first operation trajectory can be formed by the motions of the two touch points. The trajectory direction of the first sub-trajectory 91 and the trajectory direction of the second sub-trajectory 92 may need to be further considered. That is, whether the straight-line distance between the first touch point and the second touch point decreases or increases as the touch points move can be considered. Only when the straight-line distance between the first touch point and the second touch point decreases as the touch points move, the first gesture operation corresponding to the first operation trajectory including the first sub-trajectory 91 and the second sub-trajectory 92 can be determined to satisfy the split screen gesture condition.

In some embodiments, when the screen is in the first interface state, the user can touch the screen with two fingers. When the two fingers move toward each other, an operation of the two fingers moving toward each other can be determined to satisfy the split screen gesture operation. Interfaces of applications corresponding to snapshot windows through which the two fingers pass can be controlled to be displayed on the screen in the split screen mode.

Figure 12:
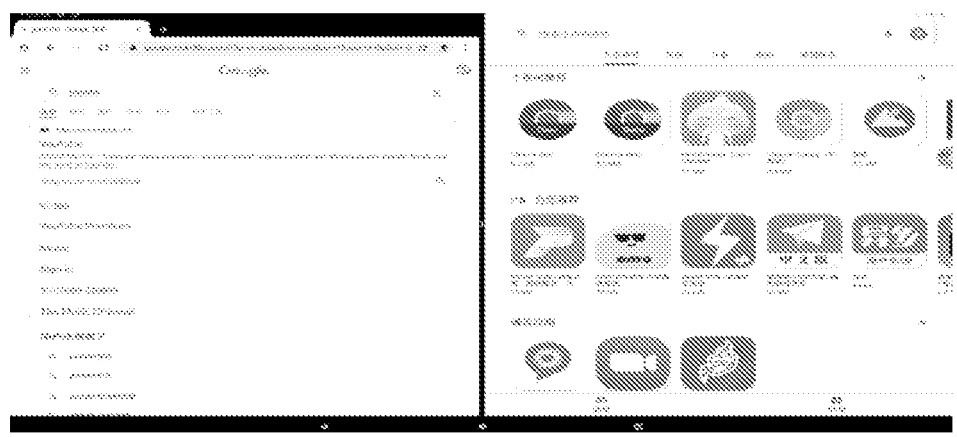
FIG. 12 illustrates a schematic diagram showing a display of two snapshot windows in a divided screen based on two trajectories according to some embodiments of the present disclosure.

In some embodiments, as shown in FIG. 11, the first sub-trajectory 111 is formed by the motion of the first touch point, and the second sub-trajectory 112 is formed by the motion of the second touch point. If the first sub-trajectory 111 and the second sub-trajectory 112 belong to the same first operation trajectory, the first sub-trajectory 111 and the second sub-trajectory 112 can be obtained simultaneously. Then, for the first sub-trajectory 111 and the second sub-trajectory 112 obtained simultaneously, the first gesture operation corresponding to the first operation trajectory including the first sub-trajectory 111 and the second sub-trajectory 112 can be directly determined as an operation satisfying the split screen gesture condition. As shown in FIG. 12, a display interface of the application corresponding to Chrome snapshot window corresponding to the first sub-trajectory 111 and a display interface of the application corresponding to Play Store snapshot window corresponding to the second sub-trajectory 112 are controlled to be displayed on the screen in the split screen mode.

Further, no matter whether two, three, or four snapshot windows through which the first sub-trajectory and the second sub-trajectory pass, the display interfaces corresponding to the plurality of snapshot windows through which the first sub-trajectory and the second sub-trajectory pass can be controlled to be displayed on the screen in the split screen mode to divide the screen into three or four sub-screens.

For example, as shown in FIG. 9, directions of the first sub-trajectory and the second sub-trajectory are shown exemplarily. If the screen is in the first interface state, an interface of the screen displays 6 snapshot windows not 4 snapshot windows shown in FIG. 9. That is, two snapshot windows are further displayed above the row of YouTube and Chrome. In some other embodiments, 9 snapshot windows can be displayed in the interface of the screen. That is, three snapshot windows can be displayed on a left side of a column of Chrome and settings. Thus, a start point of the second sub-trajectory 92 can be the snapshot window above the snapshot window of YouTube, and an endpoint of the second sub-trajectory 92 can be still above the snapshot window of YouTube. Then, the first sub-trajectory 91 and the second sub-trajectory 92 can pass through at least three snapshot windows. Thus, interfaces of the three snapshot windows can be displayed on the screen in the split screen mode.

In some other embodiments, as shown in FIG. 11, the first sub-trajectory and the second sub-trajectory are displayed exemplarily. If the screen is in the first interface state, 9 or more snapshot windows are displayed in the interface of the screen. For example, two snapshot windows are displayed above the row of YouTube and Chrome, and three snapshot windows are displayed on the left side of the column of Chrome and settings. A start point of the first sub-trajectory 111 can be the snapshot window at an upper left corner of Chrome snapshot window, an endpoint can be still at Chrome snapshot window. Then, the first sub-trajectory 111 passes through Chrome snapshot window and the snapshot window at the upper left corner of Chrome snapshot window. Thus, the first sub-trajectory 111 and the second sub-trajectory 112 can pass through 3 snapshot windows, and interfaces of the 3 snapshot windows can be controlled to be displayed on the screen in the split screen mode.

The split screen processing method of embodiments of the present disclosure can include determining that the screen is in the first interface state. The first interface state can include the plurality of snapshot windows. The method can further include obtaining the first gesture operation for the at least two snapshot windows of the plurality of snapshot windows, determining the first operation trajectory of the first gesture operation, and if the first operation trajectory is determined to include the two sub-trajectories being in the same straight line, determining the at least two snapshot windows through which the two sub-trajectories pass and controlling the at least two snapshot windows to display on the screen in the split screen mode. In some embodiments, when the split screen display is performed on the snapshot windows of the screen, the screen can be divided for the two snapshot windows directly based on the two snapshot windows through which the first operation trajectory of the first gesture operation passes. The operations may not need to be performed on the plurality of snapshot windows that need to be displayed on the screen in the split screen mode, respectively. Thus, the operation processes can be reduced, and the split screen efficiency can be increased.

Figure 13:
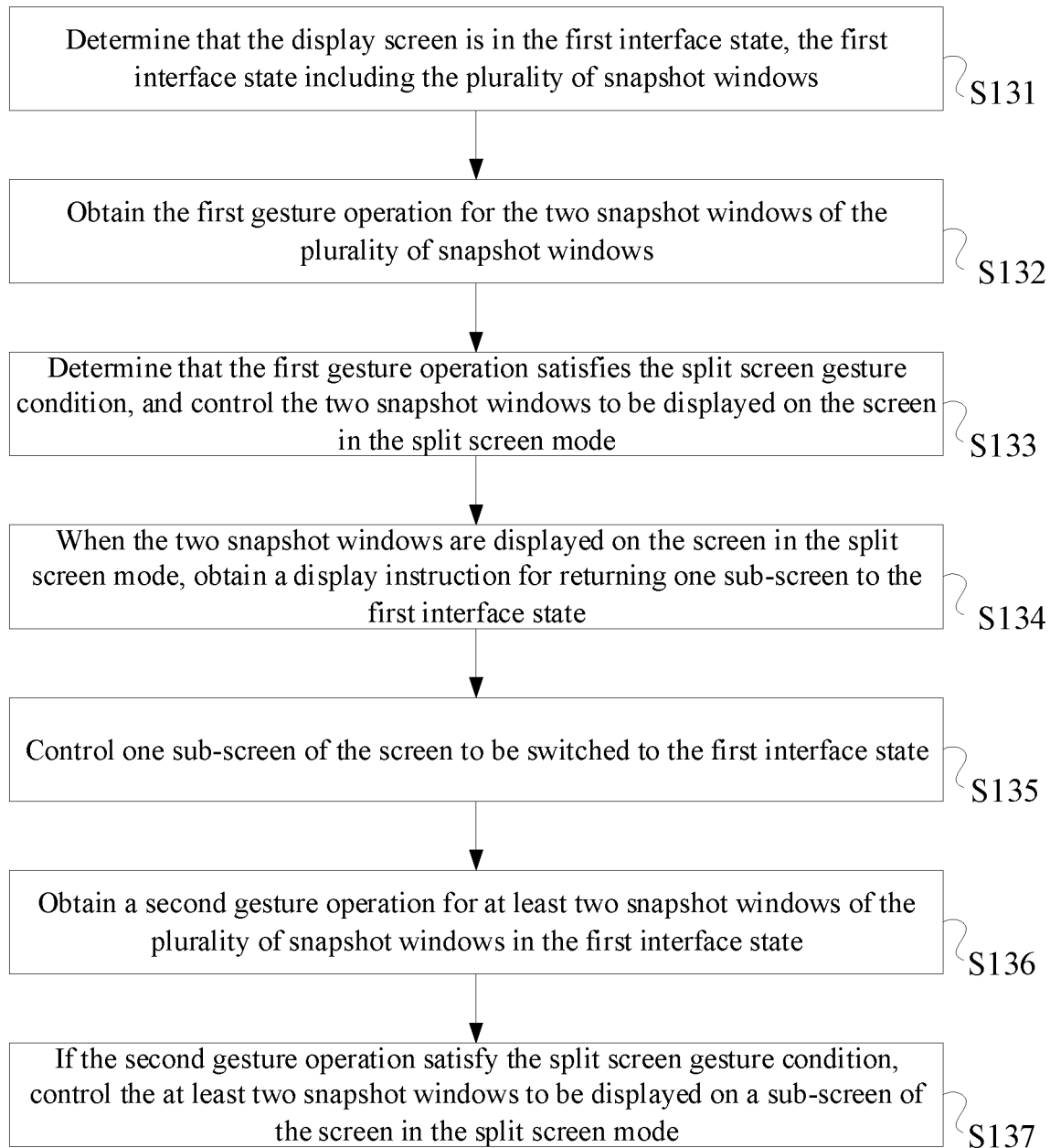
FIG. 13 illustrates a schematic flowchart of a split screen processing method according to some embodiments of the present disclosure.

As shown in FIG. 13, the split screen processing method of embodiments of the present disclosure includes the following processes.

At S131, the display screen is determined to be in the first interface state. The first interface state includes the plurality of snapshot windows.

At S132, the first gesture operation for the two snapshot windows of the plurality of snapshot windows is obtained.

At S133, the first gesture operation is determined to satisfy the split screen gesture condition, and the two snapshot windows are controlled to be displayed on the screen in the split screen mode.

At S134, when the two snapshot windows are displayed on the screen in the split screen mode, a display instruction for returning one sub-screen to the first interface state is obtained.

At S135, one sub-screen of the screen is controlled to be switched to the first interface state.

At S136, a second gesture operation for at least two snapshot windows of the plurality of snapshot windows is obtained in the first interface state.

At S137, if the second gesture operation satisfies the split screen gesture condition, the at least two snapshot windows are controlled to be displayed on a sub-screen of the screen in the split screen mode.

When the display interfaces of the applications corresponding to the two snapshot windows are displayed on the screen in a two-sub-split screen mode, if one sub-screen needs to be added to display the display interfaces of the applications corresponding to three different snapshot windows on the screen, the screen can exit the two-sub-split screen mode to cause the screen to be still in the first interface state, and then, the screen can be divided again to realize the three-sub-split screen mode.

Based on above, as shown in FIG. 5, the screen can display the display interface of the application corresponding to the first snapshot window and the display interface of the application corresponding to the second snapshot window. The screen can be divided into two sub-screens up and down or left and right. Thus, if a display interface of an application corresponding to a snapshot window needs to be added to the screen, the screen can exit from the two-sub-split screen mode to cause the screen to be in the first interface state again as shown in FIG. 2. Thus, the screen can be divided into three sub-screens in the first interface state. For example, the screen can display the display interface of the application corresponding to the first snapshot window, the display interface of the application corresponding to the second snapshot window, and the display interface of the application corresponding to the third snapshot window after the screen is divided into the three sub-screens.

In some other embodiments, if a display interface of an application corresponding to a snapshot window needs to be added in the two-sub-split screen mode, one sub-screen can be directly controlled to exit the split screen mode to cause a half-screen of the screen that exits the split screen mode to be in the first interface state. The second gesture operation satisfying the split screen gesture condition can be performed at the position of the half-screen to select two snapshot windows again. Then, the newly selected two snapshot windows can be displayed in the split screen mode on the position of the half-screen of the screen that exits the split screen mode. The display interface displayed when the screen was in the two-sub-split screen mode can be still displayed on the position of the other half-screen that does not exit the split screen mode.

Based on above, the screen can display the display interface of the application corresponding to the first snapshot window and the display interface of the application corresponding to the second snapshot window. The screen is divided into two sub-screens up and down or left and right as shown in FIG. 5. The display interface of the first snapshot window can be displayed on a left half-screen of the screen, and the display interface of the second snapshot window can be displayed on a right half-screen of the screen. When a display interface of a snapshot window needs to be added in the split screen mode, the right half-screen of the screen where the display interface of the second snapshot window is located can be selected. A display instruction can be performed on the right half-screen to return the right half-screen to the first interface state. The right half-screen of the screen can no longer display the display interface of the second snapshot window based on the display instruction but is in the first interface state. That is, only the right half-screen of the screen can be in the first interface state. The left half-screen of the screen can still display the display interface of the first snapshot window.

The right half-screen of the screen can be in the first interface state. A plurality of snapshot windows displayed in the right half-screen in the first interface state cannot include the first snapshot window. That is, the first snapshot window is missing compared to the plurality of snapshot windows displayed in the screen in the first interface state, because the display interface of the first snapshot window has been displayed on the left half-screen of the screen. Thus, the plurality of snapshot windows displayed in the right half-screen may not need the first snapshot window, which reduces non-applicable snapshot windows displayed in the right half-screen in the first interface state.

When the right half-screen of the screen is in the first interface state, the second gesture operation can be obtained to control the at least two snapshot windows related to the second gesture operation to be displayed in the right half-screen of the screen in the split screen mode when the second gesture operation satisfying the split screen gesture condition. Thus, the left half-screen of the screen can display a display interface of a snapshot window. The right half-screen of the screen can display the display interfaces of the at least two snapshot windows. Thus, the plurality of snapshot windows can be displayed in the split screen mode. The snapshot window that needs to be displayed with a larger sub-screen can be ensured to occupy half of the screen to increase the user split screen experience.

In some embodiments, the second gesture operation can be performed on the right half-screen of the screen. The second operation trajectory of the second gesture operation can correspond to at least two snapshot windows. The at least two snapshot windows can be controlled to be displayed on the right half-screen of the screen in the split screen mode.

In some embodiments, the perpendicular direction of the second operation trajectory of the second gesture operation can include at least two snapshot windows. Then, the at least two snapshot windows can be controlled to be displayed on the right half-screen of the screen in the split screen mode. In some other embodiments, the second operation trajectory of the second gesture operation can be parallel to boundaries of the at least two snapshot windows, and distances between the second operation trajectory and the boundaries of the at least two snapshot windows can be smaller than a second predetermined distance. Then, the at least two snapshot windows can be controlled to be displayed on the right half-screen of the screen in the split screen mode. The second predetermined distance and the first predetermined distance can be in a proportional relationship. For example, the first predetermined distance can be 2 times the second predetermined distance. In some other embodiments, the second operation trajectory can include two sub-trajectories. The two sub-trajectories can satisfy the predetermined condition. Then, the at least two snapshot windows through which the two sub-trajectories pass can be determined. The at least two snapshot windows can be controlled to be displayed in the right half-screen of the screen in the split screen mode.

The second gesture operation can be the same as or different from the first gesture operation.

When the display screen is in the split screen mode, a display instruction can be performed on the half-screen to return the sub-screen corresponding to the half-screen to the first interface state. The display instruction can be a third gesture operation obtained from the half-screen.

In some embodiments, the third gesture operation can be obtained. If the third operation gesture is determined to satisfy a sub-screen closing gesture condition, the at least two snapshot windows displayed in the split screen mode in the screen can be closed and exit the split screen mode.

That is, when the half-screen of the screen displays a display interface of a snapshot window, and the other half-screen displays display interfaces of at least two snapshot windows, if the third gesture operation is obtained, and the third gesture operation satisfies the sub-screen closing gesture condition, the split screen mode of the screen can be closed.

In some embodiments, if the third gesture operation satisfies the full-split screen closing gesture condition, the third gesture operation can be performed to close the half-screen displaying the display interface of one snapshot window and the other half-screen displaying the display interfaces of the at least two snapshot windows. That is, the full screen may not be in the split screen mode. When the full screen exits the split screen mode, the screen can be in the first interface state, display the main interface of the electronic device, or display a display interface of an application.

If the third gesture operation satisfies the half-split screen closing gesture condition, for which half-screen the third gesture operation aims can be further determined. For example, to which half-screen the operation trajectory of the third gesture operation corresponds can be determined. If the third gesture operation is for the half-screen displaying the display interface of the one snapshot window, the half-screen can be determined as a first half-screen, e.g., a left half-screen. The first half-screen can be controlled to no longer display the display interface of the snapshot window and be in the first interface state to display a plurality of snapshot windows. The plurality of snapshot windows displayed by the first half-screen in the first interface state may not include the at least two snapshot windows displayed by the other half-screen, e.g., the at least two snapshot windows displayed by a second half-screen. If the third gesture operation is for the half-screen displaying the display interfaces of the at least two snapshot windows, i.e., the second half-screen, the second half-screen can be controlled to no longer display the display interfaces of the at least two snapshot windows to be in the first interface state and display a plurality of snapshot windows. The plurality of snapshot windows displayed by the second half-screen in the first interface state may not include the snapshot window displayed by the first half-screen. The first half-screen and the second half-screen can form the screen.

In addition, the third gesture operation for the full screen and the third gesture operation for the half-screen can be the same. With different areas corresponding to the third operation trajectory of the third gesture operation, the third gesture operation can be used to control the full screen or a half-screen. For example, the third operation trajectory can pass through the first half-screen and the second half-screen. Thus, the third operation trajectory can be determined to be for the full screen, and the third gesture operation can be an operation used to control the screen to close the split screen mode for the whole screen. If the third operation trajectory only passes through the first half-screen, the third operation trajectory can be determined to be for the first half-screen of the screen, and the third gesture operation can be used to control the first half-screen to close the split screen mode, If the third operation trajectory only passes through the second half-screen, the third operation trajectory can be determined to be for the second half-screen of the screen, and the third gesture operation can be used to control the second half-screen to close the split screen mode.

In addition, when the screen is displayed in the split screen mode, the display instruction can be performed on the half-screen to return the half-screen to the first interface state. In some embodiments, the instruction of closing the sub-screen can be directly obtained to exit the split screen mode based on the instruction of closing the sub-screen. The instruction for closing the sub-screen can be directly entered by the user for the full screen or any half-screen of the screen.

Further, realizing the three-sub-split screen mode can include determining that the first gesture operation is a sliding operation. The operation trajectory of the sliding operation can be a straight line or a broken line formed by two straight lines perpendicular to each other. Realizing the three-sub-split screen mode can further include determining that the sliding operation corresponds to at least three snapshot windows and controlling the at least three snapshot windows to be displayed on the screen in the split screen mode.

That is, when the screen is in the first interface state, the screen can be directly controlled to be divided into three sub-screens. The first operation trajectory can be a straight line. The perpendicular direction of the straight line can have three snapshot windows. For example, two snapshot windows can be on a side of the first operation trajectory, one snapshot window can be on the other side of the first operation trajectory. The three snapshot windows can be controlled to be displayed on the screen in the split screen mode, i.e., in the three-sub-split screen mode. In some other embodiments, the first operation trajectory being the straight line can be parallel to the boundaries of the three snapshot windows. Moreover, distances between the first operation trajectory and the boundaries of the three snapshot windows can be smaller than the first predetermined distance, the three snapshot windows can be controlled to be displayed on the screen in the split screen mode.

Figure 14:
FIG. 14 illustrates a schematic diagram showing a first operation trajectory formed by two straight lines perpendicular to each other according to some embodiments of the present disclosure.

In some other embodiments, when the screen is in the first interface state, the first operation trajectory can be a broken line formed by two straight lines perpendicular to each other. As shown in FIG. 14, a first operation trajectory 141 is a broken line formed by two straight lines perpendicular to each other. A perpendicular direction of a first straight line of the broken line includes two snapshot windows of Chrome and YouTube. A perpendicular direction a second straight line of the broken line includes two snapshot windows of YouTube and Play Store. The display interfaces of the three snapshot windows of Chrome, YouTube, and Play Store can be controlled to be displayed on the screen in the three-sub-split screen mode.

In some other embodiments, the first operation trajectory can include two sub-trajectories. The two sub-trajectories can satisfy the predetermined condition. When the two sub-trajectories are determined to pass through the three snapshot windows, the three snapshot windows can be controlled to be displayed on the screen in the split screen mode.

Further, realizing a four-sub-split screen mode of the screen can include determining the first operation trajectory of the first gesture operation including two straight lines perpendicular to and intersecting with each other and controlling at least two snapshot windows neighboring to the two straight lines perpendicular to and intersecting with each other to be displayed on the screen in the split screen mode.

Figure 15:
FIG. 15 illustrates a schematic diagram showing a first operation trajectory formed by two straight lines that are perpendicular to or intersect with each other according to some embodiments of the present disclosure.

As shown in FIG. 15, two straight lines that are perpendicular to and intersect with each other are denoted by 151 and 152. Four snapshot windows are neighboring to the line 151 and the line 152, including Chrome, YouTube, settings, and Play Store. Then, the four snapshot windows can be controlled to be displayed on the screen in the split screen mode.

Neighboring to the two straight lines that are perpendicular to and intersect with each other can include that a boundary of a snapshot window is parallel to any one of the two straight lines, a distance between the boundary and the straight line is smaller than the first predetermined distance, and the snapshot window is determined to be neighboring to the straight line. In some other embodiments, the snapshot window can be in a perpendicular direction of any one of the two straight lines, and a distance between the boundary of the snapshot window and the perpendicular straight line can be within a certain predetermined distance, or any one of the two straight lines passes through snapshot window. Then, the snapshot window can be determined to be neighboring to the straight line.

The left half-screen and the right half-screen of the screen are described exemplarily in embodiments of the present disclosure. The left half-screen and the right half-screen can also be described as the upper half-screen, the lower half-screen, or the half-screen, which are not limited here.

In the split screen processing method of embodiments of the present disclosure, when the screen is in the two sub-split screen mode, the operation can be performed on one of the sub-screen to switch the sub-screen to the first interface state. The second gesture operation satisfying the split screen gesture condition can still be received at the position of the sub-screen that is switched to the first interface state. Thus, the at least two snapshot windows determined by the second gesture operation can be displayed at the position of the sub-screen that is switched back to the first interface state in the split screen mode. Therefore, the two sub-screens can be switched into three sub-screens or four sub-screens. By switching the two sub-screens into the three sub-screens or the four sub-screens in this manner, one sub-screen of the two sub-screens can be always in a size during the two sub-screens. The size of the sub-screen may not be reduced as a number of the sub-screens increases.

Figure 16:
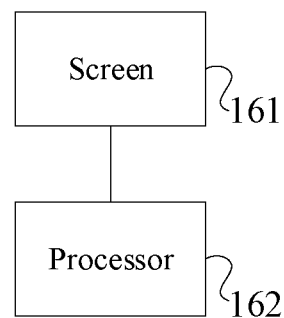
FIG. 16 illustrates a schematic structural diagram of an electronic device according to some embodiments of the present disclosure.

Embodiments of the present disclosure provide an electronic device. As shown in FIG. 16, the electronic device includes a screen 161 and one or more processors 162.

In some embodiments, the screen can be a touch screen.

The one or more processors 162 can be configured to determine that the screen 161 is in the first interface state. The first interface state can include the plurality of snapshot windows. The one or more processors 162 can be further configured to obtain the first gesture operation for the at least two snapshot windows of the plurality of snapshot windows, determine that the first gesture operation satisfies the split screen gesture condition, and control the at least two snapshot windows to be displayed on the screen in the split screen mode.

The electronic device of embodiments of the present disclosure can be implemented based on the split screen processing method of embodiments of the present disclosure, which is not repeated here.

The electronic device of embodiments of the present disclosure can be configured to determine that the display screen is in the first interface state. The first interface state can include the plurality of snapshot windows. The electronic device can be further configured to obtain the first gesture operation for the at least two snapshot windows of the plurality of snapshot windows, determine that the first gesture operation satisfies the split screen gesture condition, and control the at least two snapshot windows to be displayed on the screen in the split screen mode. In the technical solution, when the split screen display is performed on the snapshot windows of the screen, the split screen display can be realized directly based on the first gesture operation satisfying the split screen gesture condition. The operations may not need to be performed on the plurality of snapshot windows that need to be displayed in the split screen mode, respectively. Thus, the operation processes can be reduced, and the split screen efficiency can be increased.

Embodiments of the present disclosure are described in a progressive manner. Each embodiment focuses on differences from other embodiments. Same or similar parts of the embodiments can be referred to each other. Since the device of embodiments of the present disclosure corresponds to the method of embodiments of the present disclosure, the description can be simple, and the relevant parts can be referred to the method part of embodiments of the present disclosure.

Those of skill in the art can further understand that units and algorithms of embodiments of the present disclosure can be implemented by electronic hardware, computer software, or a combination thereof. To describe the interchangeability of the hardware and software, components and steps of embodiments of the present disclosure have been generally described above according to the functions. Whether the functions are implemented as hardware or software depends upon a particular application and a design constraint of the technical solution. Those skilled in the art can use different methods to implement the described functions for each particular application, which cannot be considered as departing from the scope of the present disclosure.

The steps of the method or algorithm described in connection with embodiments of the present disclosure can be embodied directly in hardware, a software module executed by the one or more processors, or in a combination thereof. The software module can be arranged in a random access memory (RAM), a memory, a read-only memory (ROM), an electrically programmable ROM, an electrically erasable programmable ROM, a register, a hard drive, a removable disk, a CD-ROM, or any other form of storage medium known in the art.

The description of embodiments of the present disclosure is provided to enable those skilled in the art to implement or use the present disclosure. Various modifications to these embodiments are apparent to those skilled in the art. The generic principles defined here can be applied to other embodiments without departing from the spirit or scope of the present disclosure. Thus, the present disclosure is not limited to the embodiments described above but conforms to the widest scope consistent with the principles and novel features of the present disclosure.

What is claimed is:

1. A split screen processing method, comprising:
determining that a screen is in a first interface state, the first interface state including a plurality of snapshot windows; obtaining a first gesture operation for at least two snapshot windows of the plurality of snapshot windows; and determining that the first gesture operation satisfies a split screen gesture condition, and controlling the at least two snapshot windows to be displayed on the screen in a split screen mode,
wherein determining that the first gesture operation satisfies the split screen gesture condition, and controlling the at least two snapshot windows to be displayed on the screen in the split screen mode include:
in response to determining that a perpendicular direction of the first operation trajectory includes two snapshot windows, controlling the two snapshot windows in the perpendicular direction of the first operation trajectory to be displayed on the screen in the split screen mode; or in response to determining that the first operation trajectory is parallel to boundaries of the two snapshot windows, and distances between the first operation trajectory and the boundaries of the two snapshot windows are smaller than a first predetermined distance, controlling the two snapshot windows to be displayed on the screen in the split screen mode.

2. The method of claim 1, wherein determining that the first gesture operation satisfying the split screen gesture condition, and controlling the at least two snapshot windows to be displayed on the screen in the split screen mode include: determining a first operation trajectory of the first gesture operation; and in response to determining the at least two snapshot windows corresponding to the first operation trajectory, controlling the at least two snapshot windows to be displayed on the screen in the split screen mode.

3. The method of claim 2, wherein in response to determining the at least two snapshot windows corresponding to the first operation trajectory, controlling the at least two snapshot windows to be displayed on the screen in the split screen mode includes: in response to the first operation trajectory including two sub-trajectories satisfying a predetermined condition, determining the two snapshot windows through which the two sub-trajectories pass, and controlling the two snapshot windows to be displayed on the screen in the split screen mode.

4. The method of claim 3, further comprising: when the two snapshot windows are displayed on the display screen in the split screen mode, obtaining a display instruction for returning one sub-screen to the first interface state; controlling the one sub-screen of the screen to be switched to the first interface state; obtaining, in the first interface state, a second gesture operation for at least two snapshot windows of the plurality of snapshot windows; and in response to the second gesture operation satisfying the split screen gesture condition, controlling the at least two snapshot windows to be displayed on one sub-screen of the screen in the split screen mode.

5. The method of claim 1, further comprising: obtaining a third gesture operation; and in response to determining that the third operation gesture satisfies a sub-screen closing gesture condition, controlling the at least two snapshot windows to close split screen display on the screen; or obtaining a sub-screen closing instruction, and exiting the split screen display based on the sub-screen closing instruction.

6. The method of claim 1, wherein determining that the first gesture operation satisfies the split screen gesture condition, and controlling the at least two snapshot windows to be displayed on the screen in the split screen mode include: in response to determining that an operation trajectory of the gesture operation includes two straight lines that are perpendicular to and intersect with each other, controlling the at least two snapshot windows neighboring to the two straight lines that are perpendicular to and intersect with each other to be displayed on the screen in the split screen mode.

7. The method of claim 1, wherein determining that the screen is in the first interface state includes: determining at least one application that is in a running status on an electronic device and has a running time satisfying a predetermined time condition, and determining that the screen is in the interface state in response to the at least one application being displayed on the screen in a snapshot window.

8. A split screen processing method, comprising: determining that a screen is in a first interface state, the first interface state including a plurality of snapshot windows; obtaining a first gesture operation for at least two snapshot windows of the plurality of snapshot windows; and determining that the first gesture operation satisfies a split screen gesture condition, and controlling the at least two snapshot windows to be displayed on the screen in a split screen mode, wherein determining that the first gesture operation satisfies the split screen gesture condition, and controlling the at least two snapshot windows to be displayed on the screen in the split screen mode include: determining that the first gesture operation is a sliding operation, an operation trajectory of the sliding operation being a straight line or a broken line formed by two straight lines that are perpendicular to each other; and determining that the sliding operation corresponds to at least three snapshot windows, and controlling the at least three snapshot windows to be displayed on the screen in the split screen mode.

9. An electronic device, comprising: a screen; and one or more processors configured to: determine that a screen is in a first interface state, the first interface state including a plurality of snapshot windows; obtain a first gesture operation for at least two snapshot windows of the plurality of snapshot windows; and determine that the first gesture operation satisfies a split screen gesture condition, and control the at least two snapshot windows to be displayed on the screen in a split screen mode, wherein the one or more processors are further configured to: in response to determining that a perpendicular direction of the first operation trajectory includes two snapshot windows, control the two snapshot windows in the perpendicular direction of the first operation trajectory to be displayed on the screen in the split screen mode; or in response to determining that the first operation trajectory is parallel to boundaries of the two snapshot windows, and distances between the first operation trajectory and the boundaries of the two snapshot windows are smaller than a first predetermined distance, control the two snapshot windows to be displayed on the screen in the split screen mode.

10. The device of claim 9, wherein the one or more processors are further configured to: determine a first operation trajectory of the first gesture operation; and in response to determining the at least two snapshot windows corresponding to the first operation trajectory, control the at least two snapshot windows to be displayed on the screen in the split screen mode.

11. The device of claim 10, wherein the one or more processors are further configured to: in response to the first operation trajectory including two sub-trajectories satisfying a predetermined condition, determine the two snapshot windows through which the two sub-trajectories pass, and control the two snapshot windows to be displayed on the screen in the split screen mode.

12. The device of claim 11, wherein the one or more processors are further configured to: when the two snapshot windows are displayed on the display screen in the split screen mode, obtain a display instruction for returning one sub-screen to the first interface state; control the one sub-screen of the screen to be switched to the first interface state; obtain, in the first interface state, a second gesture operation for at least two snapshot windows of the plurality of snapshot windows; and in response to the second gesture operation satisfying the split screen gesture condition, control the at least two snapshot windows to be displayed on one sub-screen of the screen in the split screen mode.

13. The device of claim 9, wherein the one or more processors are further configured to: obtain a third gesture operation; and in response to determining that the third operation gesture satisfies a sub-screen closing gesture condition, control the at least two snapshot windows to close split screen display of the screen; or obtain a sub-screen closing instruction, and exit the split screen display based on the sub-screen closing instruction.

14. The device of claim 9, wherein the one or more processors are further configured to: in response to determining that an operation trajectory of the gesture operation includes two straight lines that are perpendicular to and intersect with each other, control the at least two snapshot windows neighboring to the two straight lines that are perpendicular to and intersect with each other to be displayed on the screen in the split screen mode.

15. The device of claim 9, wherein the one or more processors are further configured to: determine at least one application that is in a running status on an electronic device and has running time satisfying a predetermined time condition, and determine that the screen is in the interface state in response to the at least one application being displayed on the screen in a snapshot window.

16. An electronic device, comprising: a screen; and one or more processors configured to: determine that a screen is in a first interface state, the first interface state including a plurality of snapshot windows; obtain a first gesture operation for at least two snapshot windows of the plurality of snapshot windows; and determine that the first gesture operation satisfies a split screen gesture condition, and control the at least two snapshot windows to be displayed on the screen in a split screen mode, wherein the one or more processors are further configured to: determine that the first gesture operation is a sliding operation, an operation trajectory of the sliding operation being a straight line or a broken line formed by two straight lines that are perpendicular to each other; and determine that the sliding operation corresponds to at least three snapshot windows, and control the at least three snapshot windows to be displayed on the screen in the split screen mode.

\* \* \* \* \*